United States Patent
Chou et al.

(10) Patent No.: US 9,737,843 B2
(45) Date of Patent: Aug. 22, 2017

(54) FUEL TANK CAP CAPABLE OF CAPTURING HARMFUL VAPORS

(71) Applicant: SENTEC E&E CO., LTD., Taoyuan Hsien (TW)

(72) Inventors: Chun-Chi Chou, Taoyuan Hsien (TW); Chia-Ming Yu, Taoyuan Hsien (TW)

(73) Assignee: SENTEC E&E CO., LTD., Taoyuan Hsien (TW)

( * ) Notice: Subject to any disclaimer, the term of this patent is extended or adjusted under 35 U.S.C. 154(b) by 19 days.

(21) Appl. No.: 15/137,784

(22) Filed: Apr. 25, 2016

(65) Prior Publication Data

US 2017/0128877 A1    May 11, 2017

(30) Foreign Application Priority Data

Nov. 11, 2015   (CN) .................... 2015 2 0897026 U

(51) Int. Cl.
| | | |
|---|---|---|
| *B01D 53/04* | (2006.01) | |
| *B60K 15/035* | (2006.01) | |
| *B60K 15/04* | (2006.01) | |

(52) U.S. Cl.
CPC ........ *B01D 53/0407* (2013.01); *B60K 15/035* (2013.01); *B60K 15/0406* (2013.01); *B01D 2253/102* (2013.01); *B01D 2257/708* (2013.01); *B01D 2259/4516* (2013.01)

(58) Field of Classification Search
CPC .......... B01D 53/0407; B01D 2253/102; B01D 2257/708; B01D 2259/4516; B60K 15/035; B60K 15/0406
USPC .......... 96/108, 121, 131, 152, 147; 123/518; 220/303, 371
See application file for complete search history.

(56) References Cited

U.S. PATENT DOCUMENTS

| 8,408,415 B2* | 4/2013 | Schmalz ............ B60K 15/0406 220/367.1 |
|---|---|---|
| 2003/0089717 A1 | 5/2003 | Gerdes |
| 2007/0108212 A1 | 5/2007 | Nelson |
| 2009/0294450 A1* | 12/2009 | Schmalz ............ B60K 15/0406 220/371 |
| 2011/0290118 A1* | 12/2011 | Tanaka .................. B60K 15/04 96/139 |
| 2013/0001229 A1* | 1/2013 | Wang .................. F02M 25/0854 220/373 |
| 2013/0341331 A1* | 12/2013 | Bork .................. B60K 15/0406 220/560.03 |

(Continued)

FOREIGN PATENT DOCUMENTS

CN        202381202 U    8/2012

*Primary Examiner* — Frank Lawrence
(74) *Attorney, Agent, or Firm* — Chun-Ming Shih

(57) ABSTRACT

A fuel tank cap includes a casing; a main chamber disposed in the casing; a vapor vent channel disposed in the casing and communicating with the main chamber; annular partition walls disposed in the main chamber and configured to divide the main chamber into troughs, each partition wall including a cut so that the troughs are capable of communicating with each other via the cut; and activated carbon filled in the troughs. The vapor vent channel includes the cuts and the troughs. The activated carbon captures fuel vapors and absorbs VOCs in the fuel vapors when the fuel vapors pass through the vapor vent channel. The invention eliminates the low efficiency problem of capturing the harmful VOCs of the fuel vapors by the conventional activated carbon canister.

15 Claims, 3 Drawing Sheets

(56) References Cited

U.S. PATENT DOCUMENTS

2016/0256814 A1* 9/2016 Bork ................ B60K 15/0406

* cited by examiner

FUEL TANK CAP CAPABLE OF CAPTURING HARMFUL VAPORS

BACKGROUND OF THE INVENTION

1. Technical Field

The invention relates to devices for capturing harmful volatile organic compounds (VOCs) in fuel vapors and more particularly to a fuel tank cap capable of capturing harmful VOCs in fuel vapors generated in a fuel tank of an automobile.

2. Related Art

Extracted hydrocarbons in a liquid form are referred to as petroleum. Gasoline is a transparent, petroleum-derived liquid that is used primarily as a fuel in internal combustion engines of, for example, automobiles. VOCs in fuel vapors generated in a fuel tank are harmful when breathing into the body. Thus, it is important to recover or capture the harmful vapor prior to releasing into the atmosphere.

Fuel tank system of an automobile is used to store gas. The fuel tank system consists of an independent fuel tank and a fuel tank attached to an engine. The fuel tank has an opening for filling gas (i.e., refueling). Vapor may be generated by evaporation of the gas stored in the fuel tank. A cap is provided on the opening for preventing VOCs in the fuel vapors from escaping the fuel tank.

Vapors can exert pressure on an inner surface of the fuel tank. The pressure can be either expansion pressure or contraction pressure. Specifically, in the example of a fuel tank attached to an automobile engine, gas may quickly turn into vapor when temperature is sufficiently high (i.e., high temperature environment), thereby exerting an expansion pressure on the inner surface of the fuel tank. To the contrary, gas may slowly turn into vapor when temperature is sufficiently low (i.e., low temperature environment) or when gas flows to the engine (i.e., decreasing gas in the fuel tank), thereby exerting a contraction pressure on the inner surface of the fuel tank. Both the expansion and contraction pressures should be limited not to exceed a maximum value by regulation and substantial elimination. Otherwise, the fuel tank may explode if the expansion pressure exceeds the maximum value or the gas flow from the fuel tank to the engine is greatly adversely affected if the contraction pressure exceeds the maximum value.

Conventionally, techniques of regulating both the expansion and contraction pressure involve installing a pressure balance device in the fuel line between the fuel tank and the engine, in the fuel tank, or in the fuel tank cap and the pressure balance device may communicate with the atmosphere.

In the example of installing a pressure balance device, an activated carbon canister is installed in the fuel line between the fuel tank and the engine or installed in the fuel tank in advanced technology. The activated carbon canister is provided in a vapor vent channel which is located between a head space in the fuel tank and the atmosphere. The pressure balance device is implemented as an activated carbon canister can balance internal pressure of the fuel tank and the atmospheric pressure and acts as a vehicle fuel vapor emission control system.

Specifically, in response to internal pressure of the fuel tank greater than the atmospheric pressure (i.e., in the case of being expansion pressure), fuel vapors in the fuel tank may pass through a chamber containing activated carbon canister in the vapor vent channel. The activated carbon canister may capture the VOCs in the fuel tank by absorption. The filtered fuel vapors are less harmful and thus are safe to release into the atmosphere. To the contrary, in response to internal pressure of the fuel tank less than the atmospheric pressure (i.e., in the case of being contraction pressure due to consumption of gas), air may enter the fuel tank via the vapor vent channel to increase pressure in the fuel tank. As a result, a pressure balance inside and outside the fuel tank is reached.

However, there are many dead ends in the conventional activated carbon canister in the vapor vent channel and in turn it may adversely affect harmful vapors absorption by the activated carbon. Moreover, in the case of the activated carbon canister being formed integrally with and inside the fuel tank, manufacturers may increase the size of the chamber for receiving an increased amount of activated carbon in order to increase the absorbability of the harmful vapors. However, it has disadvantages including increasing the size and the manufacturing cost of the fuel tank cap, complicating the construction of the fuel tank cap, lowering convenience in use, and making the product less practicable. Thus, the need for improvement still exists.

BRIEF SUMMARY

It is therefore one object of the invention to provide a fuel tank cap for eliminating problems associated with the conventional activated carbon canister in the fuel tank cap including dead end in the vapor vent channel and low efficiency of capturing the harmful VOCs of the fuel vapors. Specifically, the invention can increase efficiency of capturing the harmful VOCs of the fuel vapors without increasing sizes of the fuel tank cap and the chamber for the receipt of the activated carbon canister.

For achieving above and other objects, the invention provides a fuel tank cap comprising a casing; a main chamber disposed in the casing; a vapor vent channel disposed in the casing and communicating with the main chamber; a plurality of annular partition walls disposed in the main chamber and configured to divide the main chamber into a plurality of troughs, each partition wall including a cut so that the troughs are capable of communicating with each other via the cut; and activated carbon filled in the troughs; wherein the vapor vent channel is comprised of the cuts and the troughs; and wherein the activated carbon is configured to capture fuel vapors and absorb volatile organic compounds (VOCs) in the fuel vapors when the fuel vapors pass through the vapor vent channel.

Benefits and advantages of the invention include the following: The troughs for receiving the activated carbon are concentric in the casing. The cut on each trough communicates with the vapor vent channel so that a replenishment of the activated carbon is made easy and saves time. Quality of the activated carbon replenishment is reliable. The fuel vapors can smoothly pass through the activated carbon in the vapor vent channel. Space in the casing is fully utilized. The fuel tank cap is compact. The efficiency of capturing the harmful VOCs of the fuel vapors is increased greatly.

Preferably, the casing is disposed on an opening of a fuel tank. There are further provided a passageway formed through a center of the main chamber, and a through hole formed above the outermost trough. The partition walls and the troughs are concentric about the passageway. It is envisaged by the invention that limited space of the fuel tank cap can be fully utilized.

Preferably, the cuts are spaced apart and alternate. A circuitous path of the fuel vapors passing through the activated carbon in the vapor vent channel is formed, thereby increasing the amount of the harmful VOCs in the fuel vapors absorbed by the activated carbon. Less activated carbon can be used for saving the manufacturing cost if the VOCs in the fuel vapors are less harmful due to low density.

Preferably, the passageway, the cuts, and the through hole are aligned. A circuitous path of the fuel vapors passing through the activated carbon in the vapor vent channel is formed.

Preferably, the casing is disposed on an opening of a fuel tank. There is further provided a head space formed on an upper portion of the fuel tank above a surface of gas filled in the fuel tank. The head space is configured to communicate with the atmosphere via the vapor vent channel. It is envisaged by the invention that the vapor vent channel can balance pressure in the fuel tank and the atmosphere, especially when pressure in the head space increases de to evaporation of the fuel in the fuel tank, by passing the fuel vapors through the activated carbon in the vapor vent channel. Further, the harmful VOCs in the fuel vapors are absorbed by the activated carbon. As a result, substantially harmless fuel vapors are released into the atmosphere without polluting the air.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
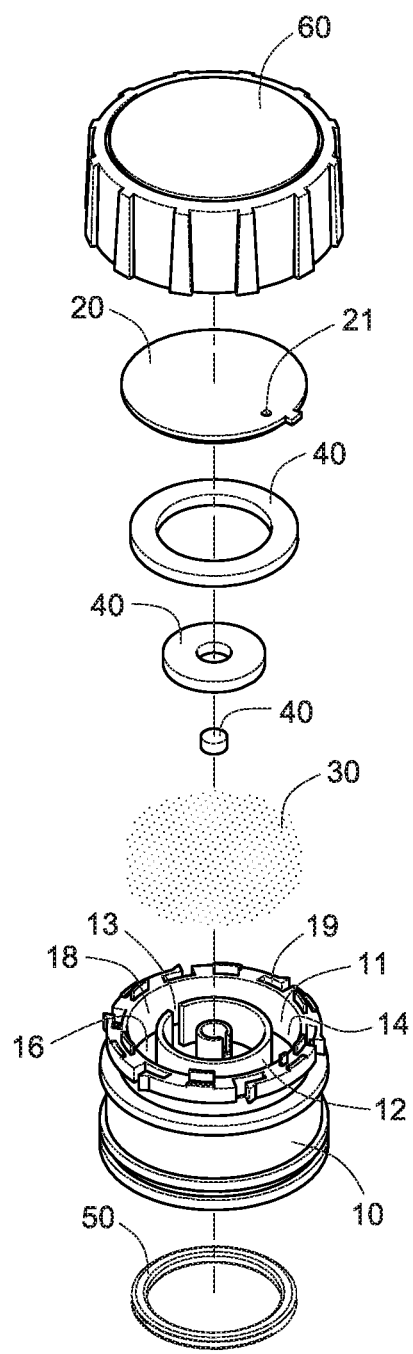
FIG. 1 is a perspective view of a fuel tank cap according to the invention.
Figure 2:
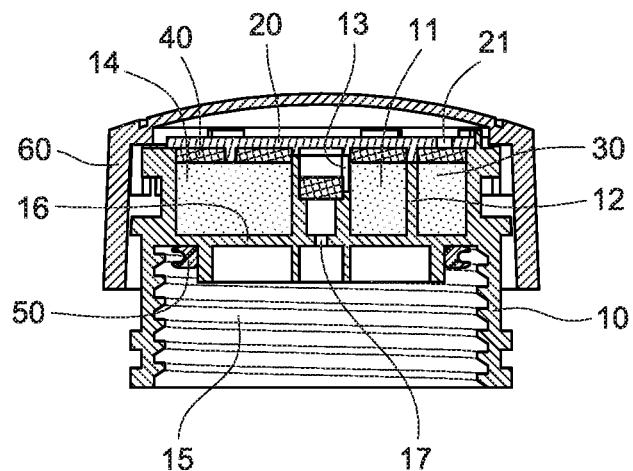
FIG. 2 is a longitudinal sectional view of the assembled fuel tank cap.

Referring to FIGS. 1 to 4, a fuel tank cap in accordance with the invention comprises the following components as discussed in detail below.

A casing 10 includes a main chamber 11 and a vapor vent channel 18 in the main chamber 11. The casing 10 is implemented as a cap secured to the opening of a fuel tank of an automobile formed by injection molding. A divider 16 is formed in the casing 10 to divide the casing 10 into the main chamber 11 and a lower chamber 15. A passageway 17 is formed through a center of the divider 16 for communicating the main chamber 11 with the lower chamber 15. A sealing disc 20 is releasably secured onto a top of the casing 10 to seal the main chamber 11. The sealing disc 20 has a through hole 21 for communicating the main chamber 11 with the atmosphere. The lower chamber 15 has internal threads for securing to the externally threaded opening of the fuel tank of an automobile. An O-ring 50 is put on an inner structure of the lower chamber 15 as a seal against vapor when the casing 10 is secured onto an object such as the opening of the fuel tank of an automobile.

An annular partition wall 12 in the main chamber 11 divides the main chamber 11 into two concentric troughs 14. The passageway 17 communicates with an axial tunnel of the main chamber 11. The troughs 14 are filled with activated carbon 30. Three non-woven members 40 of different shapes are provided between the troughs 14 and the sealing disc 20 for holding the activated carbon 30 in place. Otherwise, the activated carbon 30 may leave the troughs 14 via the passageway 17 and the through hole 21. The non-woven members 40 allow air to pass through and do not block fuel vapors from passing through the activated carbon 30. The fuel vapors comprise volatile organic compounds (VOCs) emitted by gas in the fuel tank of an automobile.

Figure 3:
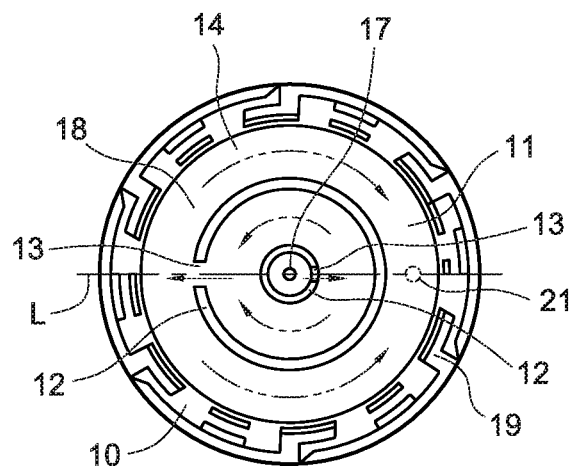
FIG. 3 is a top view of the casing.

As shown in FIGS. 1 and 3 specifically, a cut 13 is formed in the partition wall 12 and the two troughs 14 may communicate each other via the cut 13. The vapor vent channel 18 consists of the passageway 17, the through hole 21, and the troughs 14. Fuel vapors may leave the main chamber 11 via the vapor vent channel 18. Specifically, the cut 13 in the partition wall 12 can increase distance of the fuel vapors passing though the vapor vent channel 18, thereby allowing the activated carbon 30 to fully absorb the fuel vapors. As implemented, the passageway 17, the through hole 21, and the cut 13 are aligned as indicated by a line L.

As shown in FIGS. 1 and 3 specifically, a cap 60 provided on and around the sealing disc 20 for preventing foreign particles (e.g., dust) from being accumulated on and blocking the through hole 21. Otherwise, the fuel vapors in the vapor vent channel 18 may not be released into the atmosphere via the through hole 21. Specifically, a plurality of grooves 19 arranged as a loop are formed on the top of the casing 10 so that the vapor vent channel 18 may communicate with the atmosphere via the grooves 19.

As shown in FIG. 3 specifically, a vent path of the fuel vapors in the lower chamber 15 starts from the passageway 17, the vapor vent channel 18, and the troughs 14 and ends at the through hole 21. A reverse path of air entering the lower chamber 15 starts from the through hole 21, the vapor vent channel 18, and the troughs 14 and ends at the passageway 17.

Figure 4:
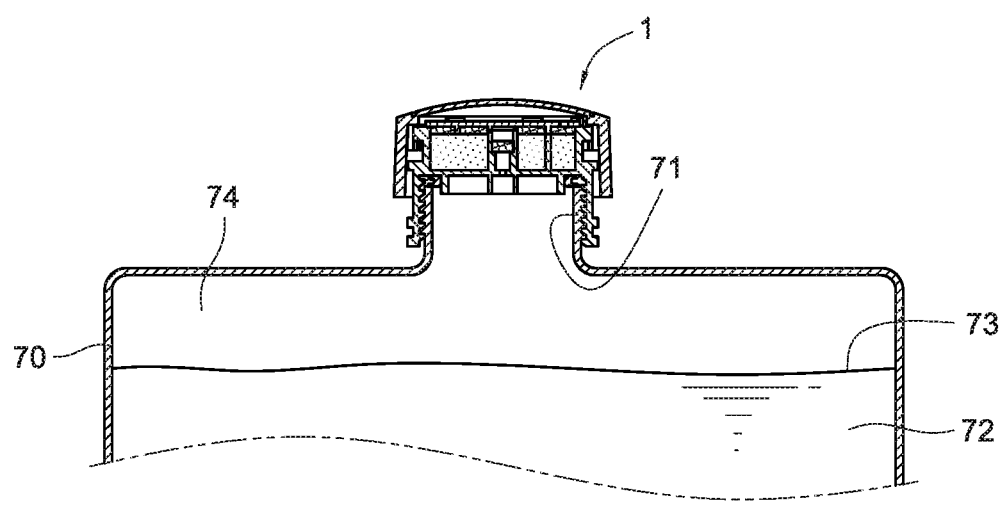
FIG. 4 is a fragmentary view of the fuel tank cap mounted on the opening of a fuel tank of an automobile.

As shown in FIG. 4 specifically, the casing 10 is implemented as a fuel tank cap 1 secured to an opening 71 of a fuel tank 70 of an automobile. Specifically, the opening 71 is formed integrally with the fuel tank 70 and has external threads. The fuel tank cap 1 is threadedly secured to the opening 71 of the fuel tank 70.

The fuel tank 70 is not completely filled with gas 72. That is, a head space 74 is formed on an upper portion of the fuel tank 70 above the surface 73 of the gas 72. The head space 74 communicates with the opening 71 which in turn may communicate with the atmosphere. Fuel vapors formed by evaporation of the gas 72 fill the head space 74. The fuel vapors may be released into the atmosphere via the vapor vent channel 18 in the fuel tank cap 1. The activated carbon 30 can capture the fuel vapors when the fuel vapors pass through it, thereby preventing the harmful volatile organic compounds (VOCs) in the fuel vapors from escaping into the atmosphere. As a result, air pollutant released into the atmosphere is decreased to a minimum.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A fuel tank cap comprising:
   a casing;
   a main chamber disposed in the casing;
   a vapor vent channel disposed in the casing and communicating with the main chamber;
   a plurality of annular partition walls disposed in the main chamber and configured to divide the main chamber into a plurality of troughs, each partition wall including a cut so that the troughs are capable of communicating with each other via the cut; and activated carbon filled in the troughs;

wherein the vapor vent channel is comprised of the cuts and the troughs; and wherein the activated carbon is configured to capture fuel vapors and absorb volatile organic compounds (VOCs) in the fuel vapors when the fuel vapors pass through the vapor vent channel.

2. The fuel tank cap of claim 1, wherein the casing is disposed on an opening of a fuel tank.

3. The fuel tank cap of claim 2, wherein the troughs formed by the partition walls are concentric.

4. The fuel tank cap of claim 2, wherein the cuts are spaced apart and alternate.

5. The fuel tank cap of claim 4, wherein the cuts are aligned.

6. The fuel tank cap of claim 3, further comprising a passageway formed through a center of the main chamber, and a through hole formed above the outermost trough, and wherein the partition walls and the troughs are concentric about the passageway.

7. The fuel tank cap of claim 6, wherein the vapor vent channel further comprises a passageway and a through hole both communicating with the cuts and the troughs.

8. The fuel tank cap of claim 6, wherein the passageway, the cuts, and the through hole are aligned.

9. The fuel tank cap of claim 1, wherein the casing is disposed on an opening of a fuel tank, further comprising a head space formed on an upper portion of the fuel tank above a surface of gas filled in the fuel tank, the head space being configured to communicate with the atmosphere via the vapor vent channel.

10. The fuel tank cap of claim 9, wherein the troughs formed by the partition walls are concentric.

11. The fuel tank cap of claim 9, wherein the cuts are spaced apart and alternate.

12. The fuel tank cap of claim 11, wherein the cuts are aligned.

13. The fuel tank cap of claim 10, further comprising a passageway formed through a center of the main chamber, and a through hole formed above the outermost trough, and wherein the partition walls and the troughs are concentric about the passageway.

14. The fuel tank cap of claim 13, wherein n the vapor vent channel further comprises a passageway and a through hole both communicating with the cuts and the troughs.

15. The fuel tank cap of claim 13, wherein the passageway, the cuts, and the through hole are aligned.

* * * * *